(12) United States Patent
Braun et al.

(10) Patent No.: US 9,147,894 B2
(45) Date of Patent: Sep. 29, 2015

(54) SOLID OXIDE FUEL SYSTEM

(75) Inventors: Robert J. Braun, Arvada, CO (US); Sean C. Emerson, Broad Brook, CT (US); Justin R. Hawkes, Marlborough, CT (US); Ellen Y. Sun, South Windsor, CT (US); Jean Yamanis, South Glastonbury, CT (US); Tobias H. Sienel, East Hampton, MA (US); Balbir Singh Bal, Wolverhampton (GB); Stuart Anthony Astley, Wolverhamptons (GB); Thomas D. Radcliffe, Vernon Rockville, CT (US); James T. Beals, West Hartford, CT (US); Walter H. Borst, Jr., Coventry, CT (US); May L. Corn, Manchester, CT (US); Louis Chiappetta, Jr., South Windsor, CT (US); John T. Costello, Tolland, CT (US); Robert R. Hebert, Storrs, CT (US); Thomas Henry Vanderspurt, Glastonbury, CT (US)

(73) Assignee: Ballard Power Systems Inc., Burnaby (CA)

( * ) Notice: Subject to any disclaimer, the term of this patent is extended or adjusted under 35 U.S.C. 154(b) by 1089 days.

(21) Appl. No.: 13/144,006

(22) PCT Filed: Jan. 9, 2009

(86) PCT No.: PCT/US2009/000158
§ 371 (c)(1),
(2), (4) Date: Jul. 11, 2011

(87) PCT Pub. No.: WO2010/080082
PCT Pub. Date: Jul. 15, 2010

(65) Prior Publication Data
US 2012/0045701 A1 Feb. 23, 2012

(51) Int. Cl.
*H01M 8/04* (2006.01)
*H01M 8/06* (2006.01)
*H01M 8/12* (2006.01)

(52) U.S. Cl.
CPC ...... *H01M 8/04089* (2013.01); *H01M 8/04022* (2013.01); *H01M 8/0612* (2013.01); *H01M 2008/1293* (2013.01); *Y02E 60/50* (2013.01); *Y02E 60/525* (2013.01)

(58) Field of Classification Search
USPC .......................................................... 429/423
See application file for complete search history.

(56) References Cited

U.S. PATENT DOCUMENTS 3,790,086 A 2/1974 Masai
6,045,772 A * 4/2000 Szydlowski et al. .......... 423/652

(Continued)

FOREIGN PATENT DOCUMENTS

WO WO0205363 A2 1/2002

OTHER PUBLICATIONS

Smrcka, Karel. "Selecting the right blower and pump for fuel-cell application." Creamer Media's Engineering News Real Economy News. Retrieved May 8, 2008 from <http://www.engineeringnews.co.za/print_version.php?a_id=126093>.

*Primary Examiner* — Ula C Ruddock
*Assistant Examiner* — Daniel Gatewood
(74) *Attorney, Agent, or Firm* — Seed IP Law Group PLLC

(57) ABSTRACT

A system and method satisfies temperature and pressure requirements of solid oxide fuel cell system 10 in a manner that increases the overall efficiency and decreases the overall weight of system 10. The system and method include a secondary blower 30 for boosting air stream pressure level sufficient for operation of a reformer 12 that is designed to minimize pressure drop; an integrated heat exchanger 18 for recovering heat from exhaust 36 and comprising multiple flow fields 18A, 18B, 18C for ensuring inlet temperature requirements of a solid oxide fuel cell 14 are met; and a thermal enclosure 46 for separating hot zone 48 components from cool zone 50 components for increasing thermal efficiency of the system and better thermal management.

19 Claims, 4 Drawing Sheets

(56) References Cited

U.S. PATENT DOCUMENTS

| | | |
|---|---|---|
| 6,551,734 B1 | 4/2003 | Simpkins et al. |
| 6,562,496 B2 * | 5/2003 | Faville et al. ............... 429/423 |
| 6,655,325 B1 * | 12/2003 | Botti et al. ..................... 123/3 |
| 7,169,495 B2 | 1/2007 | Pastula et al. |
| 7,226,682 B2 | 6/2007 | Tachtler et al. |
| 2003/0235748 A1 | 12/2003 | Haltiner, Jr. et al. |
| 2005/0106429 A1 | 5/2005 | Keefer |
| 2008/0057359 A1 * | 3/2008 | Venkataraman et al. ....... 429/13 |
| 2008/0118800 A1 | 5/2008 | Devriendt et al. |
| 2009/0065957 A1 * | 3/2009 | Mao et al. ..................... 261/78.1 |

* cited by examiner

US 9,147,894 B2

SOLID OXIDE FUEL SYSTEM

BACKGROUND

The present disclosure relates in general to solid oxide fuel cell power plants, and more particularly, to a system and method for satisfying temperature and pressure demands of a solid oxide fuel cell power plant in a manner that decreases the weight and increases the operating efficiency of the plant.

Solid oxide fuel cell ("SOFC") power plants are emerging as an attractive technology for mobile applications. Fuel cells generate electrical energy and heat by electrochemically combining a gaseous fuel, such as hydrogen, and an oxidant, such as oxygen, across an ion-conducting electrolyte. In solid oxide fuel cells, the electrolyte is an oxygen ion conductive ceramic membrane sandwiched between an oxygen electrode (cathode) and a fuel electrode (anode). Oxygen reacts with electrons at the cathode to form oxygen ions, which are conducted through the ceramic membrane to the anode, where the oxygen ions combine with hydrogen and carbon monoxide to form water and carbon dioxide.

A typical SOFC power plant may be grouped into subsystems including but not limited to power generation, fuel processing, and air preparation subsystems. In general, the power generation subsystem comprises at least one fuel cell including an anode flow field for receiving a flow of fuel gas, a cathode flow field for receiving a flow of oxygen gas, and a ceramic electrolyte membrane separating the anode from the cathode flow fields. The fuel processing subsystem includes a reformer for generating hydrogen-rich gas fuel, frequently referred to as reformate or syngas, from a hydrocarbon fuel source for feeding to the anode channel of the fuel cell. Hydrogen gas fuel may be generated from a variety of common hydrocarbon fuel sources using methods including steam reformation, autothermal reformation, and catalytic partial oxidation. The air preparation subsystem supplies oxygen to the cathode flow field of the fuel cell, normally by drawing atmospheric air through a blower to pressurize the air to an adequate level for delivery to the cathode flow field, in addition to providing air for reformation, if needed.

Each subsystem typically has strict temperature, pressure, weight, efficiency, and other requirements. For example, the electrochemical reactions in a solid oxide fuel cell are typically performed at temperatures of between around 550-1000° C., thus necessitating that the temperature of air entering the cathode flow field be between around 450-750° C. Furthermore, to ensure adequate delivery of oxygen to the cathode electrode, the air provided to the cathode flow field must be at a pressure sufficient to overcome the pressure drop across the flow field, for example. Similarly, air delivered to fuel reformers utilizing an atomizer and a catalytic reactor must be at a pressure sufficient to overcome the even higher pressure drop associated with these components. Furthermore, the air must be heated to a temperature sufficient for ensuring the adequate mixing of fuel and air for catalytic reformation to generate a hydrogen-rich reformate gas stream for feeding to the anode flow field of the fuel cell, for example, above about 350° C. However, prior to entering the anode flow field, the reformate stream may need to be cooled such that the effective operating temperature of the fuel cell is not exceeded. In addition to the thermal management and pressure requirements listed above, SOFC systems for mobile applications must be compact and lightweight.

SUMMARY

The present disclosure relates to a solid oxide fuel cell system and method wherein air is provided at a first pressure level into a first flow stream comprising a first heat exchanger flow field and a cathode flow field. A portion of the air from the first flow stream is provided into a second flow stream at a second pressure level that is greater than the first pressure level. The second flow stream comprises a fuel reformer, a second heat exchanger flow field, and an anode flow field.

DETAILED DESCRIPTION

The thermal and pressure requirements of SOFC subsystems can be satisfied in a manner that increases the overall efficiency and decreases the overall weight of the SOFC system. The high pressure drop associated with fuel reformers in an SOFC system is addressed by a secondary blower that increases efficiency by boosting only the air needed by the reformer to the requisite pressure level, and an atomizer for a reformer having a much lower pressure drop. Providing a secondary blower eliminates the need for an independent air flow control valve, for example, further reducing weight and pressure drop of the system, while the atomizer disclosed works with a catalytic partial oxidation reactor having a lighter weight than steam-based reformers. Additionally, a more compact and lightweight integrated heat exchanger may be included for managing the requisite temperatures of both the reformer and a solid oxide fuel cell, and a thermal enclosure may be included for separating hot zone from cold zone components. A system and method for managing the temperature of the enclosure can provide better overall thermal efficiency and management of the SOFC system. These improvements and others described in more detail herein make the system and method highly suitable for mobile applications, for example.

Figure 1:
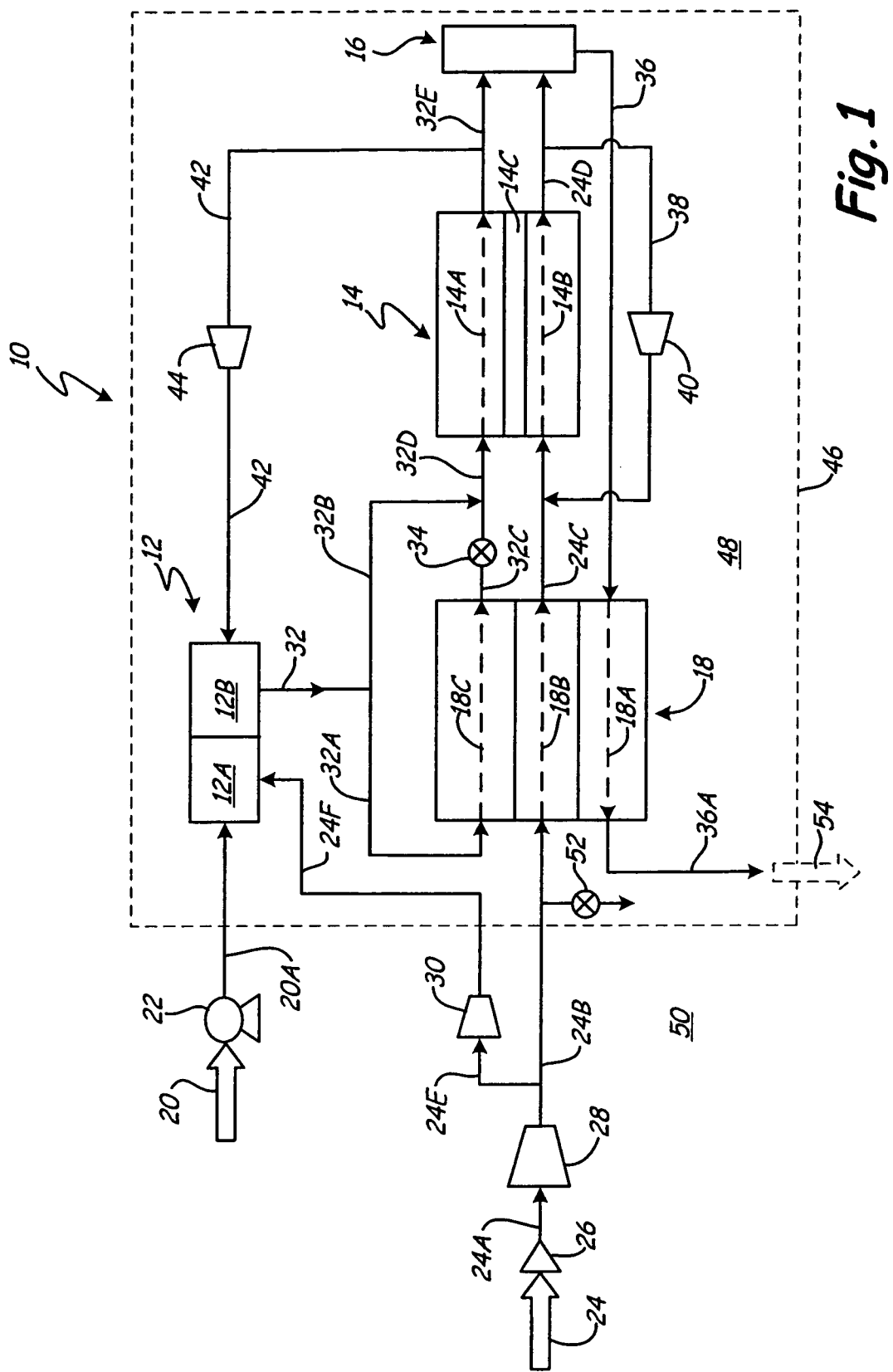
FIG. 1 is a schematic diagram of a solid oxide fuel cell system according to the system and method of the present disclosure.

FIG. 1 is a schematic diagram of a SOFC system 10 including a fuel reformer 12 comprising fuel atomizer 12A and catalytic reactor 12B; solid oxide fuel cell ("SOFC") 14 comprising anode flow field 14A, cathode flow field 14B, and ceramic membrane 14C; burner 16; heat exchanger ("HEX") 18 comprising HEX flow field 18A, 18B, and 18C; fuel source 20; fuel 20A; fuel pump 22; air source 24; air stream 24A, 24B, 24C, 24D, 24E, and 24F; ram-air scoop 26; primary blower 28; secondary blower 30; reformate stream 32, 32A, 32B, 32C, 32D, and 32E; reformate temperature control valve 34; burner exhaust 36 and 36A; air recycle line 38; air recycle blower 40; reformate recycle line 42; reformate recycle blower 44; thermal enclosure 46; hot zone 48; cold zone 50; hot zone temperature control valve 52; and thermal enclosure exhaust 54. The secondary blower 30 may also be referred to as boost blower 30. Furthermore, an exhaust flow field comprises flow fields downstream of anode flow field 14A and cathode flow field 14B, and includes air stream 24D, reformate stream 32E, burner exhaust 36 and 36A, and HEX flow field 18A.

During operation of SOFC system 10, air 24A is drawn from air source 24 as air stream 24A, and is pressurized to a first pressure level by primary blower 28 into air stream 24B. Air source 24 may be the atmosphere, for example. For mobile applications, ram-air scoop 26 may be provided to assist primary blower 28 in pressurizing air stream 24A to the first pressure level, thereby reducing the capacity and parasitic load requirements of blower 28 and allowing for a lighter weight blower to be used. In a first flow stream, air stream 24B at the first pressure level is directed through HEX flow field 18B for heating to appropriate cathode inlet temperature requirements, for example, around 450-750° C. Heated air stream 24C is then directed through cathode flow field 14B adjacent ceramic membrane 14C, and air stream 24D is exhausted into burner 16. The first pressure level provided by primary blower 28 and optionally ram-air scoop 26 is sufficient for overcoming the pressure drop across cathode HEX flow field 18B, anode flow field 14B, and other components that may be present in the first flow stream, including but not limited to pipes, valves, channels, burner 16, and HEX flow field 18A. Optionally, a portion of air stream 24D may be recycled through air recycle line 38 for further improvement of system management and consumption of unreacted oxidant, with air recycle blower 40 provided to boost the pressure of the air back to a sufficient level for cathode flow field 14B. Burner 16 is preferably a catalytic burner to enable complete combustion of the residual combustible compounds in reformate 32E stream. The catalyst in burner 16 is chosen so as to offer minor flow resistance and high activity for the oxidation of low concentration of hydrogen or carbon monoxide. The actual catalyst may be an unsupported noble metal or a highly dispersed noble metal supported by a high porosity particulate bed or honeycomb.

In a second flow stream originating off of the first flow stream, a portion of air stream 24B at the first pressure level is directed as air stream 24E to secondary blower 30. Secondary blower 30 then boosts the pressure of air stream 24E from the first pressure level to a second pressure level in air stream 24F. It is generally necessary that air stream 24F entering reformer 12 exceed a minimum temperature in order that reformer 12 can operate properly, for example, above about 350° C. While the slight compression of air stream 24E into air stream 24F by secondary blower 30 will increase its temperature, this temperature increase may not be enough to meet the reformer 12 requirements, and, in this instance, the length and heat conductive properties of pipe, for example, carrying air stream 24F could be modified to provide additional temperature adjustments according to hot zone 48 temperatures within thermal enclosure 46. Furthermore, HEX 18 may be used to heat air stream 24F prior to sending it to reformer 12, for example, as described with reference to FIG. 2 and FIG. 3.

Figure 2:
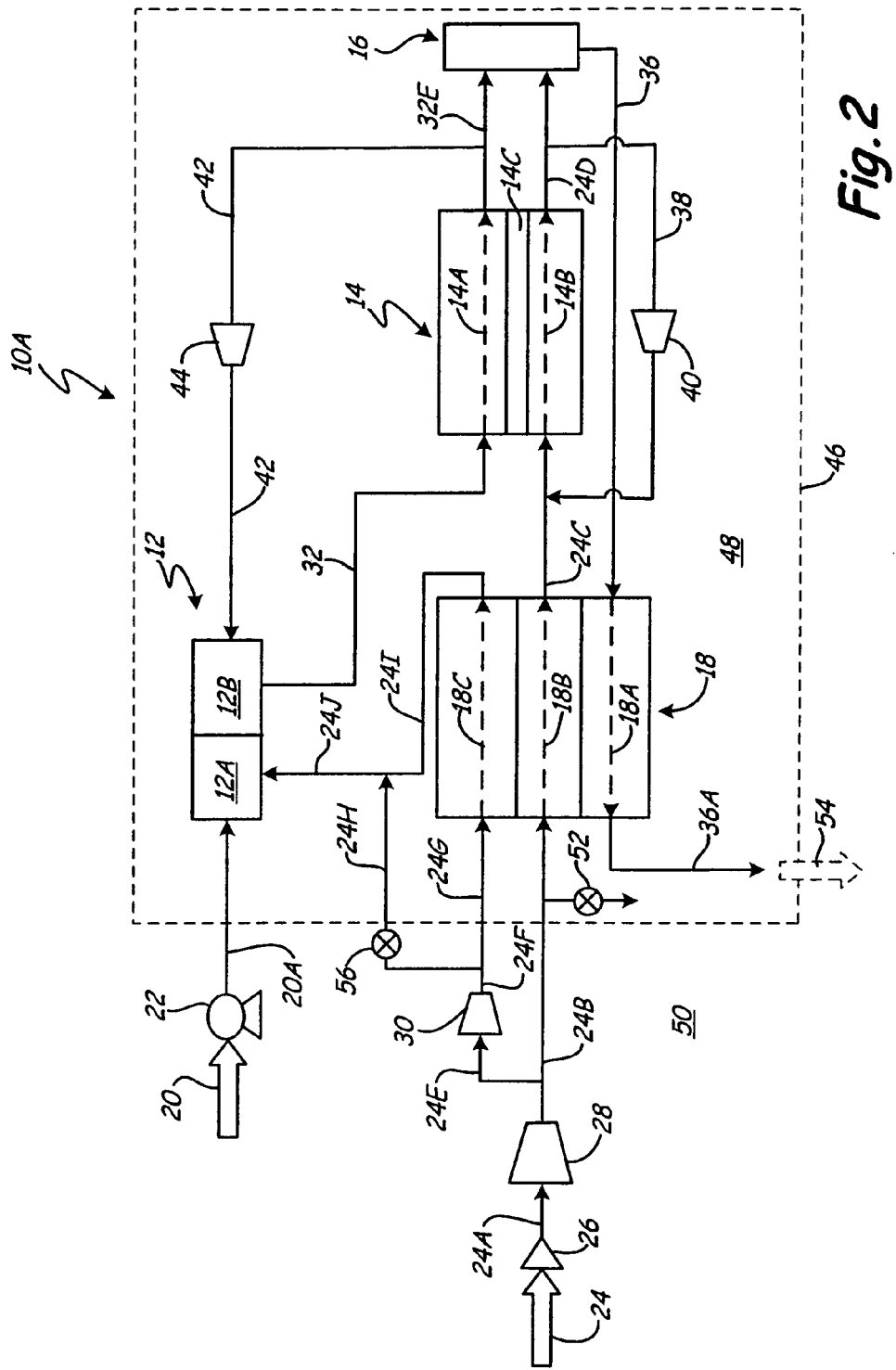
FIG. 2 is a schematic diagram of a solid oxide fuel cell system showing an alternative embodiment of the system and method of the present disclosure.
Figure 3:
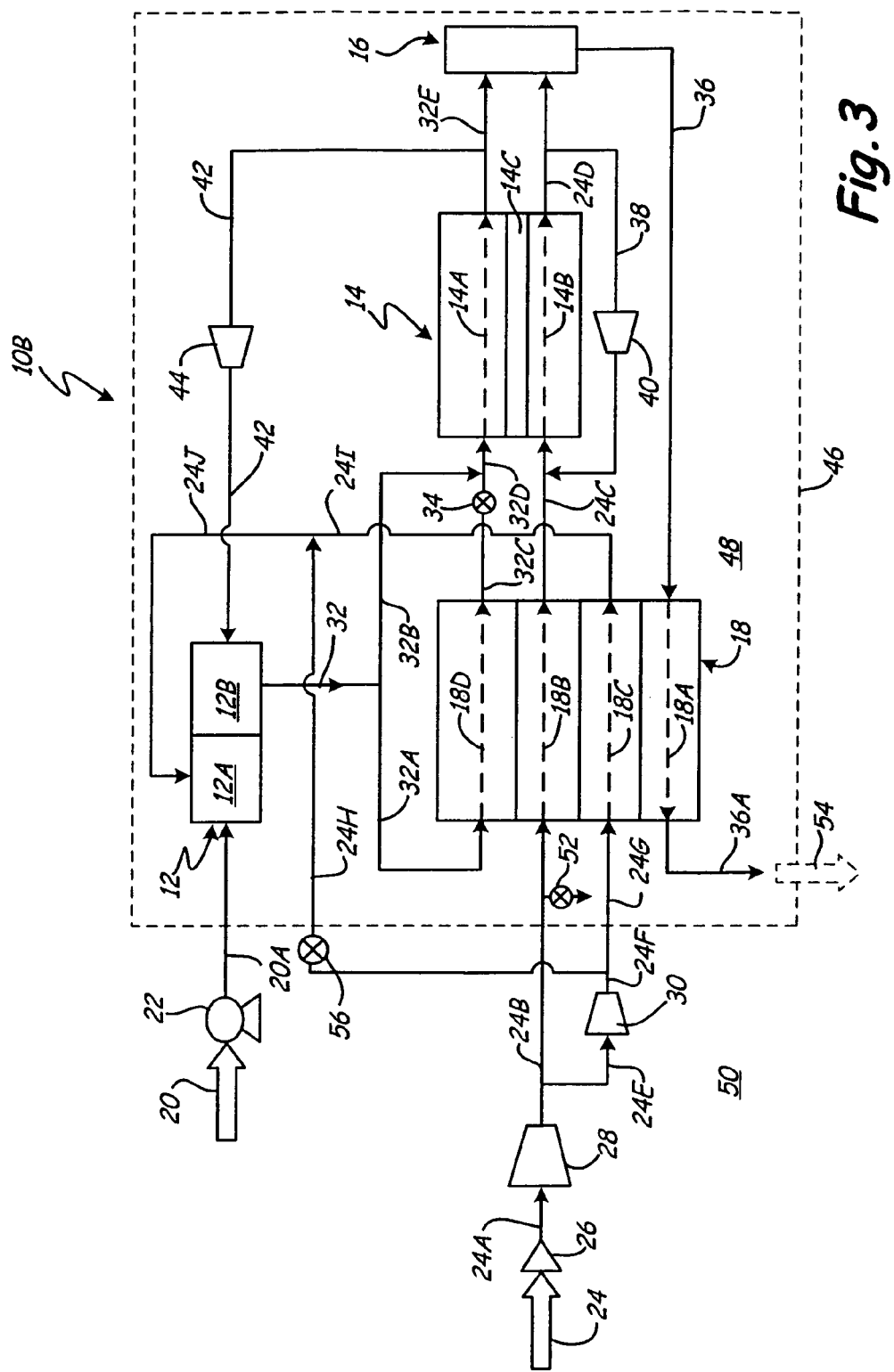
FIG. 3 is a schematic diagram of a solid oxide fuel cell system showing an alternative embodiment of the system and method of the present disclosure.

The second pressure level provided by secondary blower 30 is sufficient for overcoming the pressure drop across reformer 12, anode flow field 14A, and other components that may be present in the second flow stream, including but not limited to HEX flow field 18C, pipes, valves (e.g., reformate temperature control valve 34), channels, reformate recycle line 42, burner 16, and HEX flow field 18A. This pressure drop is typically much higher than the pressure drop across the first flow stream and only represents a small fraction of the air flow required by the first flow stream. In systems using only primary blower 28 to provide a sufficient increase of air pressure to compensate for the pressure drop associated with both the first flow stream and the second flow stream, the higher pressure drop in the second flow stream requires blower 28 to have the capacity to raise the stream pressure to the second pressure level while operating at high mass or volume throughput, resulting in loss of system efficiency and available power because the first flow stream would need to be throttled to balance pressure drops and manage flows in the first and second flow streams. As illustrated by FIGS. 1-3, efficiency can be increased and energy waste can be decreased by using secondary blower 30 to boost only a portion of the air needed from the first pressure level to the second and higher pressure level required of the second flow stream. Additionally, secondary blower 30 flowrate can be controlled by varying its speed, thus alleviating the need for a flow control valve to control the amount of air provided to reformer 12, and eliminating the control valve's associated cost, weight and pressure drop.

As air stream 24F at the second pressure level is directed to fuel atomizer 12A of reformer 12, fuel 20A is drawn from fuel source 20 by fuel pump 22, and is also directed to fuel atomizer 12A. As described in more detail with reference to FIG. 4, fuel 20A and air stream 24F are mixed in fuel atomizer 12A in such a way as to first break up the liquid fuel into a very fine spray of droplets which vaporize almost instantaneously and the resultant fuel vapor-air mixture then passes through catalytic reactor 12B to generate reformate stream 32 containing hydrogen-rich fuel. The hydrogen-rich fuel comprises hydrogen, carbon monoxide, water vapor, carbon dioxide and possibly trace amounts of low molecular weight hydrocarbons, and this hydrogen-rich fuel is commonly referred to as reformate gas or syngas. The reformation reaction that occurs in catalytic reactor 12B may impart a significant degree of heat to reformate stream 32. However, the temperature of reformate stream 32D entering SOFC 14 must meet anode inlet temperature requirements, for example, around 450-750° C. To adjust the temperature of reformate stream 32 to a proper level, a portion of it may be directed as reformate stream 32A through HEX flow field 18C for cooling, while the amount of cooled reformate stream 32C exiting HEX flow field 18C that mixes with hot reformate stream 32B may be controlled by reformate temperature control valve 34 to produce reformate stream 32D having the proper anode inlet temperature.

Reformate stream 32D may then be directed through anode flow field 14A adjacent ceramic membrane 14C, with reformate stream 32E exhausted into burner 16. Optionally, a portion of reformate stream 32E may be recycled through reformate recycle line 42 for reintroduction into reformer 12 as described in more detail with reference to FIG. 4, with reformate recycle blower 44 provided to boost the pressure of the reformate back to a sufficient level for reformer 12 and downstream components. Primary blower 28, secondary blower 30, air recycle blower 40, and reformate recycle blower 44 may be also be a pump, and can be any of a number of designs, including but not limited to a diaphragm pump, wobble plate, rotary vane, rolling piston, reciprocating piston, roots blower, and centrifugal or axial blower.

Residual unreacted hydrogen and carbon monoxide and other possible combustible constituents present in reformate stream 32E may be combusted in burner 16 with unreacted oxidant from air flow stream 24D. Although the temperature of fluids exiting SOFC 14 will be high, combustion in burner 16 can create additional heat that raises the temperature of exhaust 36 gas stream. Some of the enthalpy or heat content of exhaust 36 gas stream is recovered in HEX 18 by passing it through HEX flow field 18A. As shown in FIG. 1, HEX 18 is integrated with at least three flow fields 18A, 18B, 18C to increase the thermal efficiency and compactness of SOFC system 10.

Thermal enclosure 46 further adds thermal efficiency to SOFC system 10 by separating components requiring hot operating temperatures in hot zone 48 from those components requiring cool operating temperatures in cool zone 50. Cooled burner exhaust 36A may be vented into hot zone 48 of thermal enclosure 46, while air flow stream 24B drawn from air source 24 at ambient temperatures of 50-70° C., for example, may be released into hot zone 48 via hot zone temperature control valve 52, thus providing an additional level of thermal management of SOFC system 10 components. Thermal enclosure exhaust 54 may be provided to allow for burner exhaust 36A, air released from flow stream 24B, and other fluids, such as those leaked by hot zone 48 components, to escape thermal enclosure 46.

FIG. 2 is a schematic diagram of a SOFC system 10A showing an alternative embodiment including air flow streams 24G, 24H, 24I, and 24J, as well as air temperature control valve 56. The system and method described with reference to FIG. 2 allows for control over air stream 24J temperature entering reformer 12.

SOFC system 10A includes two air streams 24G and 24H that split off of common air stream 24F. Air stream 24F will be at a second pressure level by virtue of secondary blower 30, which is positioned upstream of the heat exchanger so as to use a blower made for ambient temperatures and of low cost. Air stream 24G is directed through HEX flow field 18C to be heated and exits as heated air flow stream 24I. Air stream 24H, drawn from air stream 24F at a cooler temperature only partially heated by compression through secondary blower 30, is introduced into heated air stream 24I in a controlled manner by air temperature control valve 56 to produce air stream 24J having proper atomizer 12A air temperature. For the catalytic reactor 12B of reformer 12 to operate properly, this air temperature needs to high enough for the air stream to have sufficient heat content (enthalpy) to ensure complete evaporation of the nebulized or atomized fuel, that is, the fine droplet spray generated at atomizer 12A. The temperature of reformate stream 32 is determined by the heat content of the vaporized fuel-air mixture just upstream of catalytic reactor 12B, the heat released by the reactions occurring in catalytic reactor 12B, and the overall heat losses from catalytic reactor 12B. This temperature may be significantly different from the required anode inlet temperature level. If temperature adjustment is needed, reformate stream 32 may be passed through a HEX flow field, for example, according to the system and method described with reference to FIG. 1 or FIG. 3 of the present disclosure. Additionally, the length and heat conductive properties of pipe, for example, carrying reformate flow stream 32 could be modified to provide additional temperature adjustments according to hot zone 48 temperatures within thermal enclosure 46.

FIG. 3 is a schematic diagram of a SOFC system 10B showing an alternative embodiment including HEX flow field 18D, and a system and method for controlling both anode inlet reformate 32D temperature (further described with reference to FIG. 1), as well as for controlling air flow field 24J temperature entering reformer 12 (further described with reference to FIG. 2). To integrate these two control features, the system and method described with reference to FIG. 3 utilizes an integrated four pass, rather than a three pass, HEX 18 including extra HEX flow field 18D. However, it may be appreciated that HEX flow fields 18A, 18B, 18C, and 18D may be rearranged such that they are not in the exact configuration shown in FIGS. 1-3 of the present disclosure, but rather, different fields may be moved adjacent other ones to create the proper temperature gradients for any given SOFC system. For example, in FIG. 3, reformate stream 32A is shown directed through HEX flow field 18D, with air stream 24G directed through HEX flow field 18C, however, these two could be interchanged simply by rerouting flow streams through HEX 18. Furthermore, flow streams could split halfway through a HEX flow field at a location determined by the temperature gradient existing across the flow field, for example. By integrating multiple flow streams through HEX 18, the weight of HEX 18 is thereby reduced while its compactness is enhanced compared with other systems using multiple heat exchangers.

The core of HEX 18, that is the flow fields shown in the schematic drawings of FIGS. 1-3, is preferably made of high-strength nickel-based alloy sheets and foils by high vacuum brazing, for example, while the plenums that enable interconnection with other equipment through piping are made of the same alloys of similar or heavier gauge sheets and welding. This design leads to a heat exchanger that is compact, lightweight (~5 $kW_{thermal}$/kg) and has high efficiency. Other designs, for example, microchannel, and methods of metal forming and joining could be used to arrive at a similar high-performance HEX 18. With regard to materials of construction, the nickel based alloys that may be used for HEX 18 may be selected from the following group: Haynes 214, Haynes 230, Hastelloy X, Inconel 600, Inconel 610, Inconel 718, Inconel 713 and similar nickel-based alloys. The preferred metal alloys for the fabrication of HEX 18 are nickel based alloys that form an alumina protective scale, such as Haynes 214 and Inconel 713, which are referred to as alumina-forming alloys. Alumina-forming alloys are preferred because they eliminate the possibility of poisoning the solid oxide fuel cell by volatile chromium compounds which emit from alloys that form chromia protective scales, e.g., chromia-forming alloys such as Haynes 230. The alumina protective scale can be formed by heat treating the HEX made from alumina-forming alloys after the HEX has been fabricated by special heat treatments in controlled atmospheres as recommended by the alloy manufacturer. The alumina protective scale in flow field 18C also inhibits carbon deposition, or coking, from the reformate gas stream and mitigation of coking leads to stable performance for the SOFC system.

Figure 4:
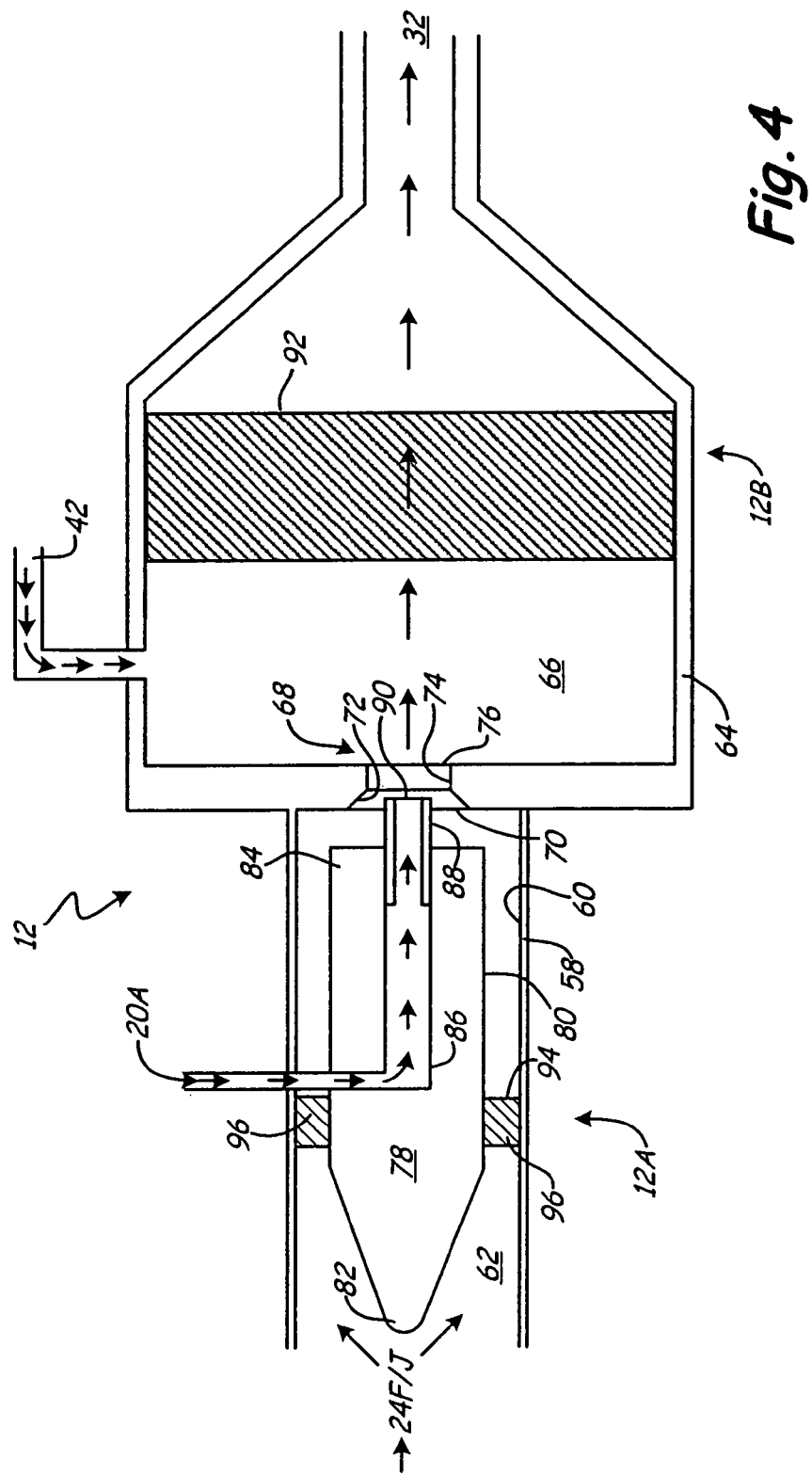
FIG. 4 is a simplified cross sectional view taken through the center of a reformer.

FIG. 4 is a simplified cross sectional diagram taken through the center of reformer 12, including fuel atomizer 12A and catalytic reactor 12B, and further showing atomizer housing 58 having inner surface 60 and upstream interior region 62; catalytic reactor housing 64 having downstream interior region 66; spray port 68 having mouth 70, chamfer 72, throat 74, and spray orifice 76; insert 78 having outer surface 80, first end 82, second end 84, and fuel conduit 86 having tip portion 88 with fuel outlet orifice 90; catalyst 92; and swirler 94 having vanes 96.

Reformer 12 operates to mix fuel 20A and air stream 24F/J in fuel atomizer 12A to vaporize the fuel and pass it through catalytic reactor 12B to generate reformate stream 32 containing hydrogen rich fuel. Fuel 20A is directed through fuel conduit 86 including fuel tip portion 88 while air stream 24F/J is directed through an air flow field defined between outer surface 80 of insert 78 and inner surface 60 of atomizer housing 58, with air swirler 94 positioned in the flow field to impart rotational motion to the air. In spray port 68, the air, having a high temperature (e.g., about 350° C. or greater) and high velocity nebulizes or atomizes the liquid fuel into fine droplets, having a diameter of about 50 μm or less, which are heated up by the hot air stream that provides both sensible heat and the heat of vaporization and the fuel fine droplets vaporize almost instantaneously as they leave fuel outlet orifice 90 of fuel tip portion 88. Spray port 68 comprises from upstream to downstream: mouth 70, chamfer 72, throat 74, and spray orifice 76. Mouth 70 has a diameter larger than the diameter of spray orifice 76 to ensure adequate flow of air through spray port 68 past fuel outlet orifice 90. Vaporized fuel is mixed with the air stream, then enters downstream interior region 66 of catalytic reactor housing 64, and is directed through catalyst 92 where it reacts to form hydrogen-rich reformate or syngas for feeding into reformate stream 32. Catalyst 92 may be a partial oxidation catalyst, allowing dry non-steam based reformation of fuel 20A, as well as resulting in an overall reduction of the weight of reformer 12. Optionally, reformate recycle line 42 may be provided to direct unused reformate back into catalytic reactor 12B which would provide superheated steam to the fuel processor 12 and change its character into what is referred to as an autothermal fuel reformer (ATR). An ATR reformer reduces the requirement for air by reforming fuel with superheated steam, produces a syngas richer in hydrogen and CO and thereby leads to significant improvement in the overall energy conversion efficiency of the SOFC system.

Reformers typically have a relatively high pressure drop, for example, between 100-200 kPa. Nonetheless, many fuel cell systems, especially portable or mobile systems, have limited air pressure driving force available for mixing and vaporization of liquid fuel 20A, for example, less than 15 kPa. Additionally, there are no commercially available reformers for small mobile power systems requiring less than 1 kg/h of liquid fuel flow for operation and air-to-fuel mass ratios between about 4 to about 8. However, reformer 12 can meet the above requirements. Features were identified affecting atomization and vaporization of fuel 20A, and a configuration of these features was discovered resulting in a reduction in pressure drop from about 100-200 kPA to less than about 5.7-11 kPA across reformer 12, while still sufficiently vaporizing fuel 20A for reformation via catalyst 92 at fuel 20A flow rates of less than 1 kg/h and air-to-fuel mass ratios of between about 4 to about 8. The configuration of features included a spray orifice 76 diameter of less than about 5 mm, more preferably in the range of around 3.18-4.78 mm, and most preferably around 3.45 mm; a chamfer 72 angle relative to mouth 70 of about 0-60 degrees, more preferably about 20-40 degrees, and most preferably about 30 degrees; a fuel tip 88 extension beyond second end 84 of insert 78 of less than about 7 mm, more preferably about 3.18-6.35 mm, and most preferably about 3.18 mm; a fuel tip recession relative to spray orifice 76 of less than about 3 mm, more preferably about 0-2.54 mm, and most preferably about 1.02 mm; and a swirler vane 96 angle of 0-30 degrees relative to the direction of air flow, more preferably about 30 degrees. To further reduce pressure drop, first end 82 of insert 78 may be conically shaped to reduce air friction.

With regard to materials of construction, the nickel based alloys that may be used for reformer 12B may be selected from the following group: Haynes 214, Haynes 230, Hastelloy X, Inconel 600, Inconel 610, Inconel 718, Inconel 713 and similar nickel-based alloys as well as FeCrAlloys. The preferred metal alloy for the fabrication of reformer 12B are nickel based alloys that form an oxide protective scale, such as Haynes 230, for example. Alumina-forming alloys are preferred because they can inhibit carbon deposition, or coking, from the reformate gas or fuel-air mixture streams and mitigation of coking leads to stable performance for the SOFC system. Fuel atomizer 12A can be fabricated out of a wider selection of materials, such as stainless steels because the temperature requirements are not as severe as for reformer 12B.

Thus, the system and method of the present disclosure provides a more efficient and lightweight SOFC system meeting even the strict temperature and pressure management demands of mobile applications, for example. While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

The invention claimed is:

1. A method comprising:
operating a solid oxide fuel cell that includes an anode flow field and a cathode flow field;
exhausting the anode flow field and the cathode flow field into an exhaust flow field;
directing a first portion of the exhaust flow field through a heat exchanger that includes an anode heat exchanger flow field and a cathode heat exchanger flow field;
operating a fuel reformer;
providing air at a first pressure level into a first fluid flow stream, the first fluid flow stream directing a first portion of the air to the cathode heat exchanger flow field and the cathode flow field;
providing a second pressure level into a second fluid flow stream from a second portion of air from the first fluid flow stream, the second pressure level being greater than the first pressure level;
generating a reformate stream from the fuel reformer by directing the second portion of air with the second fluid flow stream to the fuel reformer; and
directing at least a portion of the reformate stream from the fuel reformer to the anode flow field.

2. The method of claim 1, wherein a first blower provides the first portion of air at the first pressure level into the first fluid flow stream, and wherein a second blower provides the second portion of air from the first fluid flow stream into the second fluid flow stream at the second pressure level.

3. The method of claim 1, wherein the first pressure level is sufficient to overcome a pressure drop across the cathode heat exchanger flow field and the cathode flow field.

4. The method of claim 1, wherein the second pressure level is sufficient to overcome a pressure drop across the fuel reformer, the anode heat exchanger flow field, and the anode flow field.

5. The method of claim 1, wherein the fuel reformer further comprises:
an atomizer housing comprising an inner surface and an upstream interior region;
a reactor housing connected to the atomizer housing and comprising a downstream interior region;
a spray port between the upstream interior region and the downstream interior region, the spray port comprising a mouth open to the upstream interior region, a chamfer portion downstream of the mouth, a throat portion downstream of the chamfer, and a spray orifice downstream of the throat portion and open to the downstream interior region, the mouth having a diameter larger than a diameter of the spray orifice;
an insert positioned in the upstream interior region comprising an outer surface, a first end, a second end, and a fuel conduit, the fuel conduit comprising a tip portion that extends beyond the second end and past the mouth, and is recessed relative to the spray orifice, the tip portion comprising a fuel outlet orifice; and
an air swirler positioned in the upstream interior region having an air flow field, wherein the air flow field extends between the outer surface of the insert and the inner surface of the atomizer housing for directing air through the upstream interior region, spray port, and into the downstream interior region.

6. The method of claim 5, wherein the diameter of the spray orifice is less than about 5 mm, the chamfer is at an angle of less than about 60 degrees relative to the mouth, the tip portion extends beyond the second end by a distance of less than about 7 mm, the tip portion is recessed relative to the spray orifice by a distance of less than about 3 mm, the air swirler comprises vanes having an angle of less than about 30 degrees, and wherein fuel travels through the fuel conduit at a liquid flow rate of less than or equal to 1 kg/h, and air travels through the air flow field at an air-to-fuel mass ratio of about 4 to about 6.

7. The method of claim 5, wherein the downstream interior region of the reactor housing further comprises a partial oxidation catalyst.

8. The method of claim 1, further comprising directing a second portion of the exhaust flow field through a catalytic burner prior to directing the first portion of the exhaust flow field through the heat exchanger.

9. The method of claim 8, further comprising thermally enclosing the heat exchanger, fuel reformer, solid oxide fuel cell, catalytic burner, and exhaust flow field.

10. A method comprising:
operating a solid oxide fuel cell system, the solid oxide fuel cell system including a solid oxide fuel cell having an anode flow field and a cathode flow field, the operating including:
providing air from an air source;
directing a first portion of air into a first fluid flow stream at a first pressure level;
directing the first fluid flow stream to a heat exchanger cathode flow field and the cathode flow field;
directing a second portion of air into a second fluid flow stream at a second pressure level;
directing the second fluid flow stream to a fuel reformer;
generating a reformate stream from the fuel reformer by mixing fuel supplied from a fuel source with the second portion of air in the fuel reformer;
directing a first portion of the reformate stream to the anode flow field; and
exhausting the anode flow field and the cathode flow field to an exhaust flow field.

11. The method of claim 10 further comprising pressurizing the first portion of air to the first pressure level by directing the air through a primary blower.

12. The method of claim 11 further comprising pressurizing the second portion of air to the second pressure level by directing the second portion of air through a secondary blower, the second pressure level being greater than the first pressure level.

13. The method of claim 12 wherein the secondary blower is positioned directly downstream of the primary blower.

14. The method of claim 10, further comprising:
cooling the first portion of the reformate stream, the cooling including mixing the first portion of the reformate stream with a second portion of the reformate stream, directing the second portion of the reformate stream through a first anode heat exchanger flow field.

15. The method of claim 10 further comprising generating a third portion of air into a third fluid flow stream from the second portion of air, directing the third fluid flow stream to a second anode heat exchanger flow field and the fuel reformer.

16. A system comprising:
a solid oxide fuel cell that includes an anode flow field and a cathode flow field;
an exhaust flow field configured to receive exhaust from the anode flow field and the cathode flow field;
a heat exchanger configured to receive a first portion of the exhaust flow field, the heat exchanger including an anode heat exchanger flow field and a cathode heat exchanger flow field;
a fuel reformer configured to generate a reformate stream;
a first fluid flow stream configured to receive air at a first pressure, the first fluid flow stream being configured to direct a first portion of air to the cathode heat exchanger flow field and the cathode flow field;
a second fluid flow stream configured to receive a second portion of air at a second pressure from the first fluid flow stream, the second fluid flow stream configured to direct the second portion of air to the fuel reformer to generate the reformate stream, the second pressure being greater than the first pressure; and
a third fluid flow stream configured to direct at least a first portion of the reformate stream from the fuel reformer to the anode flow field.

17. The system of claim 16, further comprising:
a fourth fluid flow stream configured to direct a second portion of the reformate stream from the fuel reformer to the anode heat exchanger flow field.

18. The system of claim 16 wherein the first fluid flow stream is directed through a primary blower and the second fluid flow stream is directed through a secondary blower.

19. The system of claim 18 wherein the secondary blower is positioned directly downstream of the primary blower.

* * * * *

UNITED STATES PATENT AND TRADEMARK OFFICE
CERTIFICATE OF CORRECTION

PATENT NO. : 9,147,894 B2
APPLICATION NO. : 13/144006
DATED : September 29, 2015
INVENTOR(S) : Robert J. Braun et al.

It is certified that error appears in the above-identified patent and that said Letters Patent is hereby corrected as shown below:

Specification

<u>Column 1, Line 3, Insert:</u>
--STATEMENT REGARDING FEDERALLY SPONSORED RESEARCH OR DEVELOPMENT
This invention was made with government support under Contract No. FA8650-06-2-2601 awarded by the Air Force. The Government therefore has certain rights in this invention.--.

Signed and Sealed this
Twenty-first Day of June, 2016

Michelle K. Lee
*Director of the United States Patent and Trademark Office*